United States Patent

Helms

Patent Number: 5,128,013
Date of Patent: Jul. 7, 1992

[54] DEPOSITION OF ELECTROACTIVE POLYMERS

[75] Inventor: Jeffrey H. Helms, Ann Arbor, Mich.

[73] Assignee: Ford Motor Company, Dearborn, Mich.

[21] Appl. No.: 628,033

[22] Filed: Dec. 17, 1990

[51] Int. Cl.⁵ .......... C25B 11/00; G02F 1/15
[52] U.S. Cl. .................. 204/290 R; 359/265; 359/273; 359/274
[58] Field of Search .......... 204/59 R, 290 R; 359/265, 273, 274; 429/213

[56] References Cited

U.S. PATENT DOCUMENTS

| | | | |
|---|---|---|---|
| 4,468,291 | 8/1984 | Naarmann et al. | 204/59 R |
| 4,502,934 | 3/1985 | Gazard et al. | 350/357 |
| 4,586,792 | 5/1986 | Yang et al. | 350/357 |
| 4,613,211 | 9/1986 | Papir et al. | 350/357 |
| 4,933,052 | 6/1990 | O'Brien et al. | 204/59 R |

Primary Examiner—Steven Marquis
Attorney, Agent, or Firm—Charles H. Ellerbrock; Roger L. May

[57] ABSTRACT

A uniform, topographically planar layer of an electroactive polymer is electrodeposited onto a conductive substrate by first electrodepositing onto the conductive substrate a thin initiating layer of a different electroactive polymer prepared from monomer having a lower oxidation potential.

15 Claims, No Drawings

DEPOSITION OF ELECTROACTIVE POLYMERS

FIELD OF THE INVENTION

This invention relates generally to the deposition of electroactive polymers onto conductive substrates. More particularly, the invention is directed to a method for initiating the deposition of electroactive polymers onto conductive substrates, thereby improving the uniformity and topography of such Polymers, and to the articles made thereby.

BACKGROUND OF THE INVENTION

Metal-like properties, such as electrical conductivity, were first discovered in molecularly doped polyacetylene in 1977 (see Shirakawa et al., J. Chem. Soc. Chem. Commun., 1977, p. 578). Since that discovery, the characteristics of several electroactive polymers have been studied extensively.

The electrochemical polymerization of a monomer suitable for preparing an electroactive polymer was initially achieved utilizing pyrrole to form polypyrrole. It was determined that polypyrrole had an electrical conductivity of 100 $Scm^{-1}$ and could undergo reversible oxidation and reduction by applying an electrical potential from about 0.8 volts to about $-0.6$ volts with respect to a saturated calomel electrode. Accompanying the oxidation/reduction process was an associated color change from blue-black to pale yellow, respectively.

The formation of electroactive polymer films on conductive substrates by electrochemical techniques has been found to produce polymer coated electrodes suitable for a variety of purposes arising either from the reversible oxidation and reduction of the polymer films or from the high electrical conductivity of the polymer films. As examples, electroactive polymer coated conductive substrates can be used to prepare electrochromic devices, "smart" windows, optical switches for information processing and charge coupled devices, electromagnetic interference devices, semipermeable membranes, catalytic electrodes, gas sensors, photovoltaic components, solid batteries, diodes, fast response non-linear optical materials, and electrostatic dissipation devices.

A severe limitation on the use of electroactive polymer coated conductive substrates for the purposes listed hereinabove, however, is the fact that electrochemically deposited conductive polymers generally have a non-uniform thickness and topography, are easily removed from conductive substrates by contact with a solvent or mechanically by moderate abrasion, and have widely ranging electrical conductivities from about $10^{-2}$ $Scm^{-1}$ to about $10^2$ $Scm^{-1}$. Thus, the non-uniformity and limited durability of electroactive polymer coated conductive substrates preclude their widespread use.

Miasic et al., "Electronically Conducting Polymer Gas Sensors," Conducting Polymers, D. Reidel Publishing Co., 1987, p. 189 discloses a method for depositing a film of polypyrrole directly onto a gold film by the electropolymerization of pyrrole from an aqueous solution, to produce an ambient temperature detection device for several industrial gases. The resistance of the polypyrrole film so produced increases in the presence of ammonia and decreases in the presence of hydrogen sulfide.

In Rubinstein et al., "Morphology Control In Electrochemically Grown Conducting Polymer Films. 1. Precoating The Metal Substrate With An Organic Monolayer," J. Am. Chem. Soc., 1990, 112, p. 6,135, a monolayer of individual p-aminothiophenol molecules was deposited onto the surface of a gold substrate to improve the adhesion thereto of an electrochemically grown polyaniline electroactive polymer film. The article states that the adhesion-promoting monolayer significantly increases the density of the electrochemically grown polymer film, and results in a radiation absorption coefficient at 6,000 Angstroms about eight times higher than the average absorption coefficient for the same film grown on "bare" gold. The substantial increase in the electroactive polymer film density is attributed to the adhesion-promoting monolayer which facilitates and regulates the bonding between the modified gold substrate surface and the growing phase of polyaniline. It is stated that the beneficial effect obtained concerning film morphology is apparently caused by a more uniform and efficient nucleation-and-growth process on the treated surface, resulting in a film with significantly improved space filling. Thus, it is recognized that an adhesion-promoting layer between an electroactive polymer film and a conductive substrate provides the dual benefit of greater durability and increased polymer density and uniformity. The deposition of a monolayer of individual p-aminothiophenol molecules, however, is difficult to achieve and accurately control. It is felt that a monolayer or multiple molecular layer of a polymer, as opposed to a monolayer of individual molecules, would improve the integrity, adhesion, and density of a subsequently applied electroactive polymer film.

U.S. Pat. No. 4,468,291 to Naarmann et al. discloses a continuous process for forming a homogeneous, uniformly thick polypyrrole polymer or copolymer film. Pyrrole monomer, which may be mixed with other comonomers such as thiophene in ratios from 1:99 to 99:1, is added to an electrochemical cell containing a solvent and an electrolyte. The polypyrrole film is electrochemically polymerized onto a continuously moving anode which is immersed and moving through the electrolyte solution. The electropolymerization is carried out at a constant current density sufficiently high so as to electrodeposit a singular, homogeneous layer of the copolymer of pyrrole and the comonomer. The patent further discloses that a second layer of polypyrrole polymer or copolymer may be electrodeposited by the patented process onto a first layer of an electrically conductive polymer (which functions as the anode) such as polyacetylene or polyphenylene, thereby forming a two-layered polymer structure. Such a Process may not be used, however, to deposit a first layer of polypyrrole and a second layer of the polymerized comonomer.

It would be desirable to prepare by a simple process an electroactive polymer coated conductive substrate, having improved polymer density, uniformity, and topography. Such an improved structure might be achieved by depositing a first layer of an electroactive polymer onto a conductive substrate, followed by the deposition thereover of a second electroactive polymer, wherein the first polymer layer functions as an initiator for the deposition of a second Polymer layer having a uniform thickness and topography.

SUMMARY OF THE INVENTION

Accordant with the present invention, an electroactive polymer coated conductive substrate having an improved polymer uniformity, density, and topography has surprisingly been discovered. The electroactive laminate comprises a conductive substrate, a first layer of an electroactive polymer prepared from a first monomer having an oxidation potential, said first layer being adhered to the conductive substrate, and a second layer of an electroactive polymer prepared substantially from a second monomer having an oxidation potential greater than the oxidation potential of the first monomer, said second layer being adhered to the first layer.

Particularly useful electroactive laminates are prepared utilizing glass supports having a first coating of fluorine-doped tin oxide and a second coating of amorphous carbon. The electroactive polymer comprises a first polymer layer prepared from monomer having a lower oxidation potential and a second polymer layer prepared from monomer having a higher oxidation potential. Conveniently, the two polymer layers may be electropolymerized onto the conductive substrate, utilizing a single electrolysis cell containing a comonomer and electrolyte solution, by applying a first electrical potential which polymerizes only the first electroactive polymer and thereafter applying a second, greater electrical potential which polymerizes both electroactive polymers.

The electroactive laminates of the present invention are particularly useful for preparing several commercial products such as, for example, electrochemical cell electrodes, electrochromic devices, and the like.

DETAILED DESCRIPTION OF THE PREFERRED EMBODIMENT

This invention is directed to the deposition of an electroactive polymer onto a conductive substrate, and more particularly to the use of an initiating layer of a first electroactive Polymer to induce the formation of a second electroactive polymer layer having a uniform thickness and topography. By the term "electroactive polymer" is meant a material electrochemically or otherwise polymerized onto a surface from a monomer solution, which polymer exhibits variable physical and/or chemical properties resulting from a chemical reaction within the polymer upon the application of an external electrical potential. Such a definition excludes materials such as, for example, liquid crystal materials which contain chemically inactive molecules. Electroactive polymer films comprising two layers according to the present invention, wherein the first layer initiates the formation of a uniform second layer, generally have greater densities and more uniform topographies. Thus, the invention contemplates an electroactive laminate comprising consecutively a conductive substrate, a first layer of an electroactive polymer, and a second layer of an electroactive polymer having a higher oxidation potential than the oxidation Potential of the first electroactive polymer, as well as a process for making same. The terms "higher" and "lower", as used herein, are intended to distinguish between the relative oxidation potentials of any two electropolymerizable monomers.

The use of electroactive polymers for certain purposes such as, for example, electromagnetic radiation transmission modulation and display devices depends in part upon such factors as film durability, stability, electrochromic cycle time, and the adaptability of a wide variety of starting materials. The electrochemical polymerization of high oxidation potential monomers such as, for example, thiophene and 3-alkylthiophene is easily achieved on certain conventional metal substrates such as, for example, gold or platinum. However, the use of electrically conductive metal oxide substrates results in the deposition of electroactive polymer films having unacceptable uniformity, density, and topography. Moreover, in the case where large surface area conductive substrates are employed, high voltages or current densities and highly toxic solvents are generally required for the electrodeposition of high oxidation potential monomers such as, for example, thiophene.

Unexpectedly, it has been discovered that the incorporation of a small amount of a lower oxidation potential monomer such as, for example, pyrrole or N-methylpyrrole along with the higher oxidation potential monomer in the supporting electrolyte solution can result in an electroactive polymer structure comprising an initial layer of the lower oxidation potential electroactive polymer and a uniform, dense, topographically planar overlayer of the higher oxidation potential electroactive polymer. This structure, however, can only be achieved by applying an initial electrical potential to the conductive substrate which is less than the oxidation potential of the higher oxidation potential monomer but greater than the oxidation potential of the lower oxidation potential monomer, followed by the application of an electrical potential about equal to or greater than the oxidation potential of the higher oxidation potential monomer.

The conductive substrates according to the present invention may be virtually any materials which are known to be useful for conducting electrical energy and upon which an electroactive polymer may be formed. Clearly, metals including, but not necessarily limited to, silver, gold, platinum, copper, aluminum, nickel, chromium, iron, tin, silicon, titanium, magnesium, tungsten, and zinc, as well as alloys and multiple layers there of may be used as conductive substrates. Furthermore, such metals may be Coated onto a support material at a thicknesses from about 20 Angstroms to several thousand Angstroms, to form a conductive substrate according to the present invention. Suitable support materials include, but are not necessarily limited to, glass, quartz, and plastics such as polycarbonates, polyacrylics, polyesters, polystyrenics, celluosics, and the like, as well as copolymers and laminates thereof.

Alternatively, the conductive substrates may comprise a support material as listed hereinabove having a layer of metal oxide on a surface thereof. Suitable metal oxides, which conveniently may be deposited in thicknesses from about 100 Angstroms to several thousand Angstroms, include but are not necessarily limited to tin oxide, indium oxide, cadmium oxide, antimony oxide, zinc oxide, and the like, as well as mixtures and multiple layers thereof. A preferred conductive substrate comprises a glass support having a layer of fluorine-doped tin oxide from about 100 Angstroms to about 10,000 Angstroms thick thereon.

For the preparation of certain useful devices employing the electroactive laminates of the present invention such as, for example, an electrochromic device, it is necessary that the conductive substrate be transparent. Such a transparent conductive substrate may comprise, for example, an electrically conductive metal or metal oxide layer on glass. The thickness of the metal or metal oxide layer must, of course, not be so great as to block the passage of visible light therethrough. Generally, the operable thickness range for transparent metal or metal oxide layers is from about 100 Angstroms to about 5,000 Angstroms, accompanied by a corresponding variance in transmissivity for the conductive substrate.

A preferred conductive substrate, comprising metal or metal oxide coated glass, may be prepared by any conventional coating process generally known in the art such as, for example, vacuum evaporation, chemical vapor deposition, sol-gel deposition, spray pyrolysis, ion plating, Sputtering, etc. Methods for depositing metal and metal oxide coatings on glass are more fully set forth in Kirk-Othermer, "Concise Encyclopedia of Chemical Technology," John Wiley & Sons, Inc., 1985, pp. 477-478, which is incorporated herein by reference thereto.

In a preferred embodiment of the present invention, the conductive substrate includes an adhesion promoting layer of electrically conductive amorphous carbon, which is deposited directly over the metal or metal oxide layer. By amorphous carbon is meant imperfectly ordered molecular structures having relatively high surface areas. Generally, planes of the carbon atoms are layered, irregular, and oriented relative to the surface of the conductive substrate. Cross-linking between the planes accounts for greater hardness and mechanical strength compared to graphitic structures which lack cross-linking of planes.

Amorphous carbon may be deposited onto a layer of metal or a metal oxide by any conventional method such as, for example, vacuum evaporation, plasma enhanced chemical vapor deposition, reactive sputtering, glow discharge, etc. The amorphous carbon may be deposited in any thickness which promotes the adhesion of a subsequently applied electroactive polymer film to the conductive substrate. Generally, a layer of amorphous carbon from about 40 Angstroms to about 1,000 Angstroms is effective to promote adhesion. Preferably, the amorphous carbon layer is from about 40 Angstroms to about 250 Angstroms thick, depending upon the particular application for the device. For optical clarity, the amorphous carbon layer must be of the preferred thickness from about 40 Angstroms to about 250 Angstroms.

The electroactive Polymers of the Present invention include any of the polymers which may be electrochemically grown or deposited onto a conductive substrate. Such electroactive polymers include, but are not necessarily limited to, polyheterocycles prepared from pyrrole, thiophene, aniline, carbazole, azulene, furan, and the like, as well as derivatives and mixtures thereof. Notable monomers from which the electroactive polymers of the present invention may be prepared include pyrrole, N-methylpyrrole, thiophene, and 3-methylthiophene. Each electroactive polymer producing monomer has a specific oxidation potential, corresponding to an electrical potential required in order to electropolymerize the monomer at the anode of an electrolysis cell. As noted hereinabove, certain monomers such as, for example, pyrrole and N-methylpyrrole have lower oxidation potentials and therefore polymerize more easily at lower voltages to produce relatively uniform films. Higher oxidation potential monomers such as, for example, thiophene and 3-methylthiophene polymerize with greater difficulty at higher voltages producing non-uniform films.

Polymerization of the monomers is carried out by a technique well known in the electrochemical art utilizing an electrolysis cell containing a solution comprising the monomers, an organic solvent, and an electrolyte. Suitable organic solvents include, but are not necessarily limited to, acetonitrile, propylene, carbonate, tetrahydrofuran, propionitrile, butyronitrile, phenylacetonitrile, dimethylformaide, dimethoxyethane, dimethylsulfoxide, pyridine, methylene chloride, and the like, as well as mixtures and aqueous solutions thereof. A preferred solvent is acetonitrile. Useful electrolytes include, but are not necessarily limited to, anion-cation pairs, wherein the cation is selected from cations such as $Li^+$, $Na^+$, $K^+$, $Cs^+$, $Mg^{++}$, $(CH_3)_4N^+$, $(C_2H_5)_4N^+$, $(C_3H_7)_4N^+$, $(C_4H_9)_4N^+$, etc., and the anion is selected from anions such as $BF_4^-$, $ClO_4^-$, $I^-$, $Br^-$, $NO_3^-$, $PF_6^-$, $AsF_6^-$, $CF_3SO_2^-$, $SbF_6^-$, $HSO_4^-$, and the like. Preferred electrolytes are lithium tetrafluoroborate and lithium perchlorate, as well as mixtures thereof. The electrolyte is generally present in the electrolyte solution at a concentration from about 0.01 to about 1.0 mole per liter.

The monomers, which form a part of the electrolyte solution, comprise a mixture of a higher oxidation potential monomer and a small amount of a lower oxidation potential monomer. A preferred higher oxidation potential monomer is thiophene and derivatives thereof such as, for example, 3-methylthiophene. A preferred lower oxidation potential monomer is pyrrole and derivatives thereof such as, for example, N-methylpyrrole. The higher oxidation potential monomer is generally present in the electrolyte solution at a concentration from about 0.005 to about 0.5 mole per liter, although the operable concentration for any particular higher oxidation potential monomer may deviate substantially from this general range. The lower oxidation potential monomer is present generally at a concentration from about 0.001% to about 1% of the concentration of the higher oxidation potential monomer, although its concentration is not sharply critical to the practice of the present invention and may therefore deviate substantially from these limits.

In operation, a conductive substrate and a counterelectrode are immersed in an electrolyte solution containing the monomers. The nature and form of the counterelectrode is not sharply critical to the deposition of the two-layered electroactive polymer structure on the anode. The counterelectrode may be any suitable electrically conducting material such as, for example, graphite, platinum, nickel, gold, and the like. These may be in the form of a plate or a lattice positioned parallel to the conductive substrate.

A positive electrical potential is applied to the conductive substrate and a negative potential is applied to the counterelectrode. The initially applied potential is less than the oxidation potential of the higher oxidation potential monomer but greater than the oxidation potential of the lower oxidation potential monomer. Thus, a quantity of the lower oxidation potential monomer polymerizes onto the surface of the conductive substrate. This initial electrical potential is maintained for a period of time sufficient to cause the deposition of an amount of the lower oxidation potential polymer which will be effective to initiate the deposition of a second generally thicker layer of the higher oxidation potential monomer, which second layer is more uniform in thickness, more dense, and substantially more planar topographically than if the higher oxidation potential polymer were electrodeposited directly onto the conductive substrate. Ideally, the thickness of the first layer of the lower oxidation potential polymer need only be equivalent to about a monolayer to initiate the formation of a uniform second layer of the higher oxidation potential polymer. However, the present invention contemplates virtually any thickness for the first electroactive polymer layer which will result in the deposition of a uniform second electroactive polymer layer.

Following the deposition of the first electroactive polymer layer, the electrical potential applied across the electrolysis cell is increased to a value about equal to or greater than the oxidation potential of the higher oxidation potential monomer. This results in the deposition of the second layer of the higher oxidation potential polymer, which of course has copolymerized therein some amount of the lower oxidation potential polymer, directly over the first electroactive polymer layer. This second layer electrodeposits as a uniform, dense, and topographically planar electroactive polymer. Generally, the second electroactive polymer layer is substantially thicker than the first electroactive polymer layer.

It is observed that the electrodeposition of higher oxidation potential monomers such as, for example, thiophene and its derivatives can result in simple uniform film growth on gold foil, while such electroactive polymer film growth is not achievable on large tin oxide or indium-doped tin oxide coated conductive substrates. Smaller surface area tin oxide coated conductive substrates, i.e., less than about a few square centimeters in surface area, have been found suitable for the growth of relatively uniform higher oxidation potential electroactive polymer films, but only at electrical potentials of about 4.2 volts. Larger surface area tin oxide coated conductive substrates, however, require excessively high electrical potentials, resulting in degradation of the electrolyte solution. Also, high electrical potentials result in the incorporation of solvent and other impurity molecules into any resultant electrodeposited polymer. As an example, the electropolymerization of thiophene at high electrical potentials (greater than about 4 volts) in acetonitrile with an alkali metal perchlorate as the electrolyte results in the anodic reaction of perchlorate radicals with the solvent to form perchloric acid and succinonitrile. Moreover, acetamide and many chlorineoxygen containing compounds are also expected to be formed under such conditions. At these high electrical potentials, only higher oxidation potential electroactive polymers having poor uniformity and topography are formed.

Conversely, lower oxidation potential monomers such as, for example, pyrrole and its derivatives may be electropolymerized to form uniform layers on large surface area tin oxide coated conductive substrates utilizing only mild electrochemical conditions. Attempts to duplicate the conditions useful for polypyrrole film formation for the electrodeposition of a higher oxidation potential polymer, however, are generally unsuccessful. At low electrical Potentials when attempting to electropolymerize thiophene, a yellow haze appears in the region surrounding the anode with a negligible observed polymer film on the anode. At higher electrical potentials of about 2.4 volts (greater than the 2.1 volts oxidation potential for thiophene) polythiophene electrodeposits onto the tin oxide coated conductive substrate in the form of teardrop shaped spots. Higher electrical potentials results in the formation of contiguous polythiophene films which are visually non-uniform and brown in color suggesting the incorporation of degradation products and impurities. Furthermore, these films are not electroactive.

It is observed, therefore, that compositionally pure, uniform higher oxidation potential electroactive polymer films such as, for example, polythiophene or poly(3-methylthiophene) cannot be electrodeposited onto certain conductive substrates such as, for example, large surface area tin oxide coated conductive substrates.

Interestingly, these same problems do not exist when electrodepositing higher oxidation potential polymers onto certain pure noble metal anodes. The interaction between unsaturated molecules and metallic surfaces of, for example, gold or platinum are well known in the art of catalysis and arise due to the interaction between pi and pi* molecular orbitals and the metal between surfaces. While not wishing to be bound by any particular theory regarding the mechanism by which a first layer of a lower oxidation potential electroactive polymer is effective to initiate the growth of a uniform, dense, and topographically planar second layer of a higher oxidation potential electroactive polymer, it is believed that certain conductive substrates such as, for example, tin oxide coated glass are not capable of sufficient interactions with lower surface active polyheterocycles such as, for example, polythiophene and its derivatives. Therefore, the growth of such lower surface activity, higher oxidation potential polymers is non-uniform. Higher surface active molecules, i.e., those having a lower oxidation potential, such as, for example, pyrrole and its derivatives more easily form uniform polymer films. Pyrrole and its alkylsubstitution derivatives have been observed to be sufficiently surface active due to the considerable dipole moment of the pyrrole ring. Conversely, thiophenes are observed to be low surface active species, at least in the absence of acid functionalities such as, for example, stearic acid which may be incorporated into the polymer chain by copolymerization to give a more surface active monomer.

The problem of non-uniform electrodeposition of high oxidation potential, low surface activity polymers may be solved by the incorporation of even trace amounts of lower oxidation potential monomers into the electropolymerization cell electrolyte solution. Application of a lower electrical potential followed by a higher electrical potential, as set forth hereinabove, conveniently may be achieved by a constant-current electropolymerization process, wherein the ratio of the lower oxidation potential to the higher oxidation potential radical cation produced would be dependent on the relative amounts of the two species and the required voltage needed to attain the set current density. At a low current density and moderate lower oxidation potential monomer concentration, the electrical potential reaches a limiting value of the lower oxidation potential, thereby causing the electrodeposition of a first layer of the lower oxidation potential polymer. As the lower oxidation potential monomer is depleted from the electrolyte solution in the region near the anode, the electrical potential rises to maintain the constant current density until reaching the higher oxidation potential at which time the higher oxidation potential monomer begins to electropolymerize onto the first layer of the lower oxidation potential electroactive polymer.

The electroactive laminates of the present invention may be used as an element in an electrochemical cell, to pass electrical current between the conductive substrate and the cell electrolyte solution, wherein the electrolyte is as defined hereinabove. The electroactive laminate may also be used as a counterelectrode or may form the electrochromic element of an electrochromic device. In a preferred embodiment, the two-layer electroactive polymer of the electroactive laminate is an electrochromic polymer, in which a physical/chemical change produced in response to electron transfer caused by an externally applied electrical potential results in a change in the reflectivity or transmissivity of the film with respect to electromagnetic radiation. Such an electroactive laminate may then be used as an element of an electrochromic display device, comprising the electroactive laminate (which functions as the electrochromic element), a counterelectrode (which may also comprise an electroactive laminate), and an electrolyte medium in electrical communication therebetween. In such an electrochromic device, either the electroactive laminate or the counterelectrode, or both, must be transparent. During operation, means for supplying an electrical potential, such as a battery and associated electrical leads, is utilized to apply a voltage between the electroactive laminate and the counterelectrode. The two-layer electroactive polymer of the electroactive laminate may thereby be switched from its oxidized to its reduced state by applying voltages generally in the range from about $-1.5$ volts to about 1.5 volts. Electrochromic polymers are typically operated using low voltages, and can provide suitable visual contrasts with an electron transfer of only several millicoulombs of electrical charge per square centimeter of display area. Switching is easily achieved by polarity changes or voltage sweeps.

EXAMPLES

Electropolymerization electrolyte solutions are Prepared by admixing about 250 ml of acetonitrile, about 0.2 mole thiophene, about 0.1 mole lithium perchlorate, and differing amounts of pyrrole ranging from about 87 ul to about 1 ul corresponding to molar concentrations from about 0.005 M to about $5.77 \mathrm{E}10^{-5}$ M. Solutions containing even lower amounts of pyrrole are also prepared by dilution to achieve operable pyrrole concentrations as low as about $10^{-18}$ M.

Electropolymerization of a specific two-layer polymer film is conducted in a solution containing about 10 ul pyrrole at a constant current of about 0.24 mA/cm$^2$, resulting in an initial electrochemical cell potential of about 1.2 volts (the oxidation potential of pyrrole). During this time, a layer of polypyrrole is deposited on an amorphous carbon and fluorine-doped tin oxide coated glass support. Thereafter, the electrochemical cell potential gradually increases to about 4.0 volts, at which time a uniform, dense, topographically planar layer of polythiophene (containing trace amounts of copolymerized polypyrrole) electropolymerizes over and adheres to the polypyrrole layer.

The delay in the rise of electrochemical cell potential, when electropolymerizing at a constant current, is directly proportional to the amount of pyrrole present in the solution and the current set point.

Solutions containing smaller amounts of added pyrrole reach the thiophene polymerization potential more quickly, but still result in uniform polythiophene film formation. At extremely low pyrrole concentrations, the 1.2 volt plateau is almost unobservable.

The characteristics of the two-layer electroactive polymer film are those of the dominant polymer, polythiophene.

These examples may be repeated with similar success by substituting the generically or specifically described reactants and/or reaction conditions recited herein for those actually used in the preceding examples.

From the foregoing description, one skilled in the art can easily ascertain the essential characteristics of this invention, and without departing from its spirit and scope, can make various changes and modifications in the invention to adapt it to various usages and conditions.

What is claimed is:

1. An electroactive laminate comprising:
   A) a conductive substrate;
   B) a first layer of an electroactive polymer, prepared from a first monomer having an oxidation potential, said first layer being adhered to the conductive substrate; and
   C) a second layer of an electroactive polymer prepared substantially from a second monomer having an oxidation potential greater than the oxidation potential of the first monomer, having copolymerized therein a small amount of the first monomer, said second layer being adhered to the first layer.

2. The electroactive laminate according to claim 1, wherein the first and second monomers are each, independently selected from the group consisting of pyrrole, thiophene, aniline, carbazole, azulene, and furan, and derivatives and mixtures thereof.

3. The electroactive laminate according to claim 2, wherein the first monomer is selected from the group consisting of pyrrole and N-methylpyrrole, and mixtures thereof, and the second monomer is selected from the group consisting of thiophene and 3-methylthiophene, and mixtures thereof.

4. The electroactive laminate according to claim 1, wherein the conductive substrate comprises:
   A) a glass support;
   B) at least one layer of metal oxide from about 100 Angstroms to about 10,000 Angstroms thick adhered to the glass support; and
   C) a layer of amorphous carbon from about 40 Angstroms to about 1,000 Angstroms thick adhered to the metal oxide.

5. The electroactive laminate according to claim 4, wherein the metal oxide comprises fluorine-doped tin oxide.

6. An electroactive laminate comprising:
   A) a glass support;
   B) at least one layer of metal oxide from about 100 Angstroms to about 10,000 Angstroms thick adhered to the glass support;
   C) a layer of amorphous carbon from about 40 Angstroms to about 1,000 Angstroms thick adhered to the metal oxide;
   D) a first layer of an electroactive polymer, prepared from a first monomer having an oxidation potential, said first layer being adhered to the layer of amorphous carbon; and
   E) a second layer of an electroactive polymer, prepared substantially from a second monomer having an oxidation potential greater than the oxidation potential of the first monomer, said second layer being adhered to the first layer.

7. The electroactive laminate according to claim 6, wherein the metal oxide comprises fluorine-doped tin oxide.

8. The electroactive laminate according to claim 6, wherein the first and second monomers are each, independently selected from the group consisting of pyrrole, thiophene, aniline, carbazole, azulene, and furan, and derivatives and mixtures thereof.

9. The electroactive laminate according to claim 8, wherein the first monomer is selected from the group consisting of pyrrole and N-methylpyrrole, and mixtures thereof, and the second monomer is selected from the group consisting of thiophene and 3-methylthiophene, and mixtures thereof.

10. An electroactive laminate, comprising:
   A) a conductive substrate, comprising:
      i) a glass support;
      ii) at least one layer of a metal oxide from about 100 Angstroms to about 10,000 Angstroms thick adhered to the glass support; and
      iii) a layer of amorphous carbon from about 40 Angstroms to about 1,000 Angstroms thick adhered to the metal oxide;
   B) a first layer of an electroactive polymer prepared from a first monomer selected from the group consisting of pyrrole and N-methylpyrrole, and mixtures thereof, said first layer being adhered to the conductive substrate; and
   C) a second layer of an electroactive polymer prepared substantially from a second monomer selected from the group consisting of thiophene and 3-methylthiophene, and mixtures thereof, said second layer being adhered to the first layer.

11. An electrochromic display device, comprising:
   A) an electroactive laminate, comprising:
      i) a conductive substrate;
      ii) a first layer of an electroactive polymer, prepared from a first monomer having an oxidation potential, said first layer being adhered to the conductive substrate; and
      iii) a second layer of an electroactive polymer, prepared substantially from a second monomer having an oxidation potential greater than the oxidation potential of the first monomer, having copolymerized therein a small amount of the first monomer, said second layer being adhered to the first layer;
   B) a counterelectrode;
   C) an electrolyte medium is electrical communication with the electroactive laminate and the counterelectrode; and
   D) means for supplying a polarity reversible voltage across the electroactive laminate and counterelectrode.

12. The electrochromic display device according to claim 11, wherein the conductive substrate comprises:
   A) a glass support;
   B) at least one layer of a metal oxide from about 100 Angstroms to about 10,000 Angstroms thick adhered to the glass support; and
   C) A layer of amorphous carbon from about 40 Angstroms to about 1,000 Angstroms thick adhered to the metal oxide.

13. The electrochromic display device according to claim 12, wherein the metal oxide comprises fluorine-doped tin oxide.

14. The electrochromic display device according to claim 11, wherein the first and second monomers are each, independently selected from the group consisting of pyrrole, thiophene, aniline, carbazole, azulene, and furan, and derivatives and mixtures thereof.

15. The electrochromic display device according to claim 14, wherein the first monomer is selected from the group consisting of pyrrole and N-methylpyrrole, and mixtures thereof, and the second monomer is selected from the group consisting of thiophene and 3-methylthiophene, and mixtures thereof.

* * * * *